No. 734,026. PATENTED JULY 21, 1903.
W. F. WHEELER.
SNOW PLOW.
APPLICATION FILED OCT. 17, 1900. RENEWED DEC. 16, 1902.
NO MODEL. 2 SHEETS—SHEET 1.
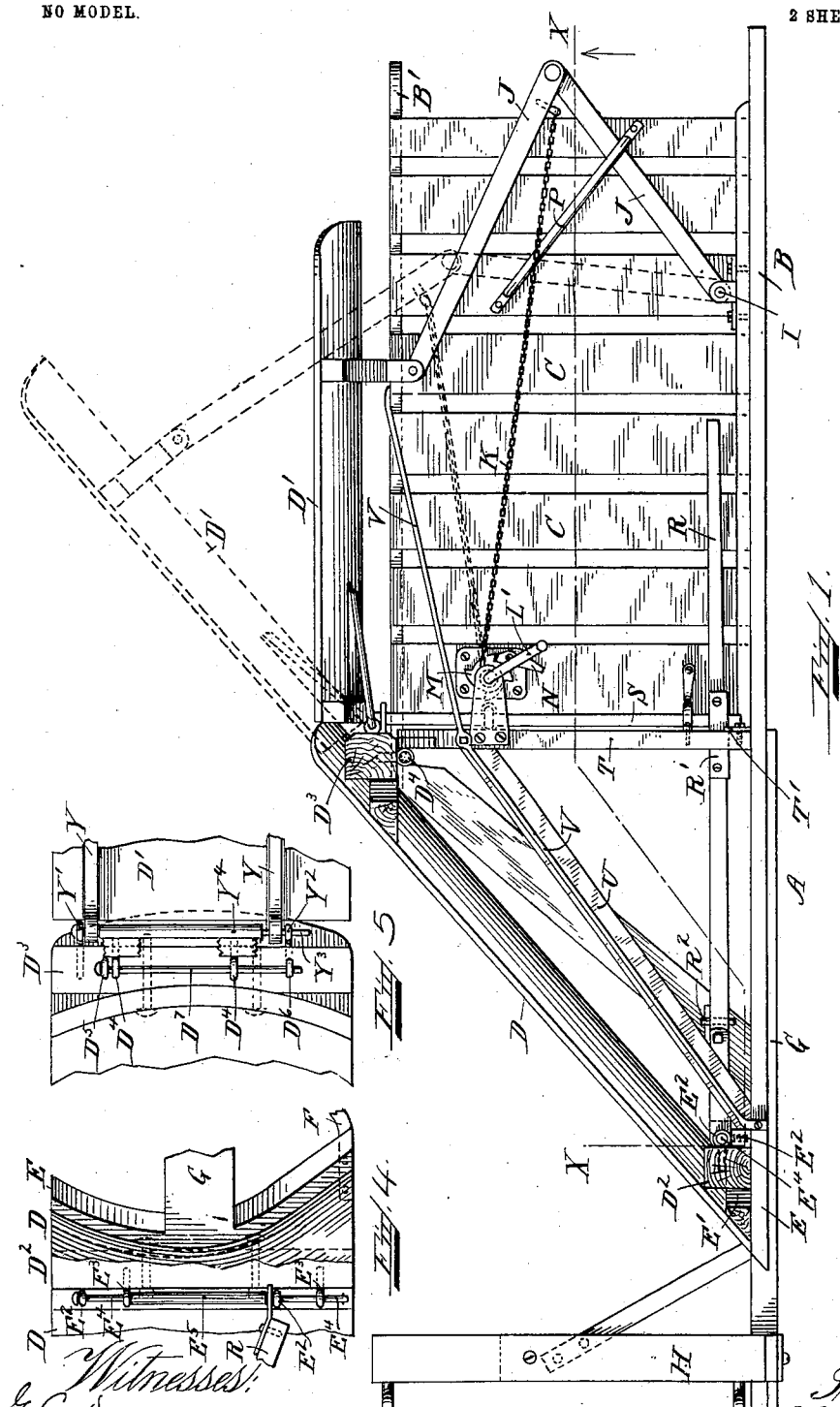

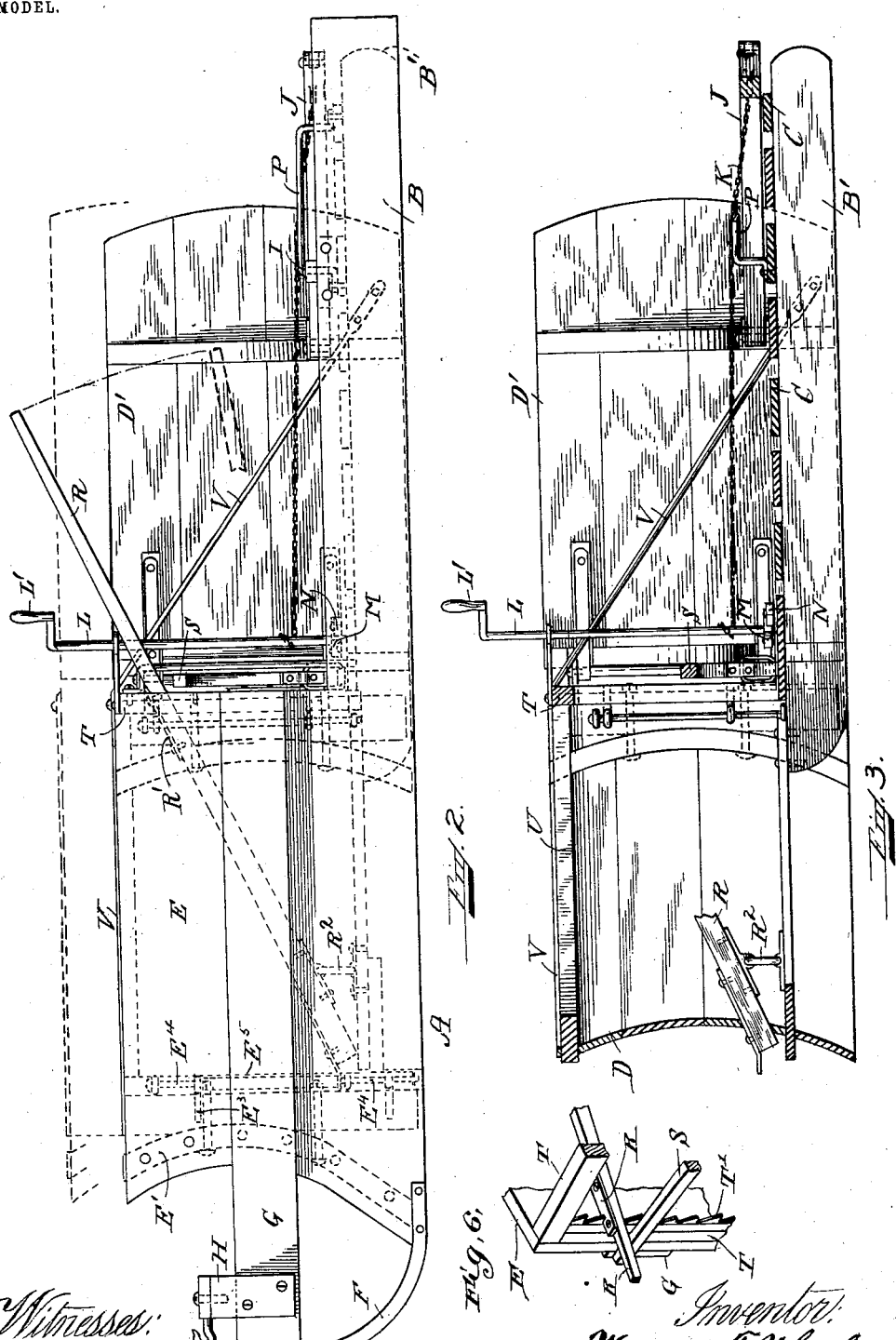

No. 734,026. Patented July 21, 1903.

UNITED STATES PATENT OFFICE.

WARREN F. WHEELER, OF STONEHAM, MASSACHUSETTS.

SNOW-PLOW.

SPECIFICATION forming part of Letters Patent No. 734,026, dated July 21, 1903.

Application filed October 17, 1900. Renewed December 16, 1902. Serial No. 135,461. (No model.)

*To all whom it may concern:*

Be it known that I, WARREN F. WHEELER, a citizen of the United States, and a resident of Stoneham, in the county of Middlesex and State of Massachusetts, have invented an Improvement in Snow-Plows, of which the following is a specification.

My invention relates to snow-plows for clearing snow from sidewalks and highways; and it consists in the improvements hereinafter described and claimed, and illustrated in the accompanying drawings, in which—

Figure 1 is a plan of a plow embodying my improvements. Fig. 2 is a side elevation of the same. Fig. 3 is a sectional elevation, the section being taken as on the dotted angular line X X, Fig. 1. Figs. 4 and 5 are detached details which will be explained. Fig. 6 is a detail in perspective of the locking-plates.

Many of the details of construction in the plow shown in the drawings are not new, but are substantially the same as the like devices for similar purposes shown and described in Letters Patent No. 518,749, issued to me April 24, 1894, but not claimed therein as in and of themselves novel, including the mechanism for swinging the wing of the scraper outward and the arrangement of levers for raising the plow. In my said former patent I employed two sleds pivoted together at their rear ends to serve as the base of the plow, upon one of which was supported the plow and upon the other, the under and inner one, was arranged the platform which supported the means for raising the plow, and the plow itself, when so raised, and the means for moving the wing hinged to the scraper. The construction of the scraping side of the plow with its hinged wing and the means and manner of moving the wing are substantially the same as in my former plow, described in said patent, and in other plows used by me before that invention.

The chief feature of novelty in my present invention relates to that part of the construction by which I raise the scraper of the plow, together with its wing, independently of the opposite side of the plow to clear it from obstacles on the street-surface while moving the plow from place to place, or whenever it may be desired to so raise it, and by which I am enabled to dispense with one of the sleds which I formerly employed for that purpose.

The plow as I now construct it consists of a sled A, comprising a long runner B and a short runner B', with open floor-planking C C, forming a platform extending across from the top of one runner to the top of the other and uniting the two. A moldboard or scraper D, having hinged thereto a wing D', forms an oblique side of the plow and extends from the short runner on the right side diagonally across to the long runner on the left side and is so attached to said left side as to have an independent vertical movement thereon, as will be described.

The left side E of the plow is firmly attached to runner B, forming therewith a plain vertical side, while the opposite scraper D is concave on its outer face and is closely connected with side E in such manner as to be supported with said side upon a common shoe F, secured to runner B at one end and upturned and secured at its opposite end to the projecting beam G, to which the drawbar H is bolted.

Upon the platform at I the mechanism for moving the wing D' is secured, consisting of the jointed bar J, connected with the wing, a chain or cord K, attached at one end to bar J and at its opposite end to a vertical rod L, arranged to be turned in proper bearings by a crank L', a ratchet M, secured to rod L, and a pawl or detent N, secured to the platform and arranged to engage the teeth of the ratchet to prevent reaction when the chain is wound around rod L in the operation of thus moving the bar J and wing D' in the well-known manner. Bar J works under a limiting-guard P, while the chain draws over the same, as shown. I employ the two levers R and S, one extending lengthwise of the plow near side E, while the other extends crosswise of the plow from the opposite side and across the path of the long lever R to raise the scraper D and its wing D' only. In my said former patent I used a similar arrangement of levers to raise the forward part of the entire plow, which was at such time supported upon the inner and under auxiliary sled pivoted thereto, as before stated. In this case I discard the auxiliary sled and raise but one side of the plow, the scraper D and wings D' supporting them on the platform of the plow through levers R and S and their attachments. In this construction, by which I do away with one sled and adapt the plow to be raised upon the scraping side only, lies the chief novelty of my present invention. I accomplish this purpose as follows:

Scraper D is secured on side E to a beam $D^2$ and at its rear end on the opposite side of the plow to a beam $D^3$. These upright beams or posts rise and fall with scraper D when it is raised and lowered. The beam $D^2$ is secured to scraper D by being bolted to the curved rib E' on the inner face of the scraper and is connected with side E by means of eyebolts $E^2$, screwed into a post attached to the inner face of side E, and eyebolts $E^3$, screwed into beam $D^2$, the eyes of all the bolts being arranged in vertical alinement and connected by a rod $E^4$, passed down through the same and properly held therein, as clearly shown in Fig. 4, which is a detail of said parts so connected, and as seen from a direction the reverse of the view in Fig. 2. The front end of scraper D is thus held closely to side E near shoe F, while it has freedom for vertical movement to the extent required on the connecting-rod. The rear end of the scraper and its wing are similarly connected with a cross-frame composed of upright side posts and a cross-beam T, extending from one side of the plow to the other. Eyebolts $D^4$ are screwed into the upright standard of frame T adjacent to wing D', as shown in broken sections in Fig. 5, and corresponding eyebolts $D^5$ and $D^6$ are screwed into post $D^3$, and all the eyes are arranged in vertical alinement and connected by rod $D^7$, passed down through the same and properly held therein. Post $D^3$ has the required freedom of vertical movement on said rod when it is moved up and down with scraper D, to which it is firmly attached, which movement is produced simultaneously with the movement of the forward end of the scraper by the action of levers R and S, as will be explained.

The hinges Y Y on wing D', as clearly shown in Fig. 5, are connected with eyebolts Y' and $Y^2$, screwed into post $D^3$, and through the eyes of which and the eyes of the hinges the rod $Y^3$ is passed and secured therein, forming the pivot of the jointed connection of the scraper and its wing.

On rod $Y^3$ a sleeve $Y^4$ is placed, the upper end of which bears against the under side of the upper hinge, while the lower end rests on the short arm of lever S, which is arranged to lift the same, with post $D^3$ and that part of the scraper that is attached thereto, at the same time that the forward end of the scraper is raised by lever R.

Lever R has its fulcrum upon the platform at $R^2$, and the iron point of its short arm rests under and against sleeve $E^5$ on rod $E^4$, as shown in Fig. 4. Lever S has its fulcrum on the platform near the hinge of the wing, and its short arm is arranged to bear upward against the lower end of sleeve $Y^4$ on rod $Y^3$ to raise the same when the long arm of the lever is depressed. This lever, as before stated, extends across the platform of the plow and crosses the path of the longer lever R, which extends at right angles to lever S, and when lever R is depressed it carries down lever S, and thus they act jointly and simultaneously on the scraper and raise the same its entire length independently of side E, and when the scraper is thus raised to clear it from obstacles on the surface of the road, while the plow is moved from place to place or for any desired purpose, it is locked in such elevated position and supported by the levers by means of plate R', arranged on lever R to engage with notches T' on an adjacent upright support of frame T near the line of movement of said lever.

By the described construction the scraping side of the plow is in a simple manner made capable of being raised without burdening the operation with the weight of the opposite side and the necessity and expense of an additional supporting-sled is avoided, thus simplifying the plow and cheapening its cost without impairing its effectiveness.

I claim—

1. A snow-plow embodying the combination of a sled comprising one long and one short runner; a platform connecting the runners; an upright frame across the front of the platform; an upright side firmly attached to the forward part of the long runner; an oblique side, or scraper, movably attached to the side on the long runner, and, at its rear end, attached in like manner to the cross-frame on the platform, such attachments being by vertically-sliding rods in suitably-fastened eyebolts; and means, supported by the platform, for raising the scraper and securing it in position on the sled; all substantially as specified.

2. A snow-plow, embodying the combination of a sled A, comprising runners B and B', platform C, side E, and cross-frame T; scraper D, with its hinged wing D'; attachments by which scraper D is secured to side E, consisting of eyebolts $E^2$, and $E^3$, and rod $E^4$; attachments by which scraper D is also secured to frame T, consisting of eyebolts $D^4$, $D^5$, and $D^6$, and rod $D^7$; a lifting mechanism by which scraper D, is raised upon its attaching-rods and suspended upon the platform of the sled, comprising levers R and S, having their fulcrums upon the platform, and their interlocking devices, consisting of plates R' and T'; and mechanism attached to the platform for operating wing D', comprising bar J, chain K, rod L, crank L', ratchet M, and pawl N; all constructed and arranged to operate in the manner and for the purposes specified.

WARREN F. WHEELER.

Witnesses:
W. W. BROOKINGS,
EUGENE HUMPHREY.